United States Patent
Boericke, II et al.

(10) Patent No.: US 8,582,393 B2
(45) Date of Patent: Nov. 12, 2013

(54) METHOD AND APPARATUS FOR CONTROLLING TEMPERATURE OF AN ACOUSTIC TRANSDUCER

(75) Inventors: Frederic S. Boericke, II, Mont Vernon, NH (US); Stephen G. Boucher, Amherst, NH (US); Francis S. Chase, Milford, NH (US); Danny J. Fladung, Springfield, NH (US); Matthew G. Kay, Washington, NH (US); Kenneth D. Rolt, Westford, MA (US)

(73) Assignee: Airmar Technology Corporation, Milford, NH (US)

( * ) Notice: Subject to any disclaimer, the term of this patent is extended or adjusted under 35 U.S.C. 154(b) by 568 days.

(21) Appl. No.: 12/885,002

(22) Filed: Sep. 17, 2010

(65) Prior Publication Data

US 2011/0228634 A1    Sep. 22, 2011

Related U.S. Application Data

(60) Provisional application No. 61/243,895, filed on Sep. 18, 2009, provisional application No. 61/303,612, filed on Feb. 11, 2010.

(51) Int. Cl.
*H04B 17/00* (2006.01)

(52) U.S. Cl.
USPC .......................................... 367/13; 367/902

(58) Field of Classification Search
USPC .................................... 367/13, 902
See application file for complete search history.

(56) References Cited

U.S. PATENT DOCUMENTS

| | | | |
|---|---|---|---|
| 6,243,654 B1 | 6/2001 | Johnson et al. | |
| 7,229,411 B2 | 6/2007 | Slayton et al. | |
| 7,369,458 B2 | 5/2008 | Sifferman et al. | |
| 7,521,023 B2 | 4/2009 | Laugharn, Jr. et al. | |
| 2009/0171342 A1* | 7/2009 | Klimovitch et al. | 606/34 |
| 2011/0228634 A1* | 9/2011 | Boericke et al. | 367/13 |

OTHER PUBLICATIONS

Johnson, R., "Proposed IEEE Standard P1451.0, Defining the Core Features of Smart Sensors to Facilitate Broader Adoption,", 1-9, (Jun. 2003).
Arnson, M., "Good News for Sensor Users: IEEE P1451.4 Meets Plug and Play," 1-7, (Oct. 2002).
Lee, K., "Smart Sensor Interface Standards," *Sensors Conference/Expo 2002, National Institute of Standards and Technology United States Department of Commerce*, (May 20, 2002).
Mark, J., and Hufnagel, P., "The IEEE 1451.4 Standard for Smart Transducers," 1-13, (Jun. 9, 2004).
Lee, K., "IEEE 1451: A Standard in Support of Smart Transducer Networking, "*IEEE Instrumentation and Measurement Technology Conference*, 1-4, (May 1-4, 2000).
Schiefer, M., and Lally, M., "A Framework for Smart Transducer Interface Systems," 1999.
Johnson, R., "Defining the Core Features of Smart Sensors to Facilitate Broader Adoption," *Smart Transducer Interface Standard-IEEE 1451*, Sensors Expo, Chicago, 1-17, (Jun. 3, 2003).
Lee, K., "A Synopsis of the IEEE P1451-Standards for Smart Transducer Communication," *National Institute of Standards and Technology*, 1-6, 1999.

* cited by examiner

*Primary Examiner* — Daniel Pihulic
(74) *Attorney, Agent, or Firm* — Hamilton, Brook, Smith & Reynolds, P.C.

(57) ABSTRACT

Embodiments relate to monitoring the temperature of a transducer and controlling the temperature as a function of adjusting one or more characteristics of the transducer.

30 Claims, 10 Drawing Sheets

METHOD AND APPARATUS FOR CONTROLLING TEMPERATURE OF AN ACOUSTIC TRANSDUCER

RELATED APPLICATIONS

This application claims the benefit of U.S. Provisional Application No. 61/243,895, filed on Sep. 18, 2009 and U.S. Provisional Application No. 61/303,612, filed on Feb. 11, 2010.

The entire teachings of the above applications are incorporated herein by reference.

BACKGROUND

As detailed in U.S. Pat. No. 7,369,458, the entire teachings of which are incorporated herein by reference, sonar devices have widespread use in sport fishing, navigation, scuba diving, as well as any number of other recreational or commercial activities. A sonar system often includes a sonar unit and a transducer. The sonar unit includes a display for providing information to the operator. The transducer is often mounted under the waterline and is responsible for generating a sonic pulse (or sound pulse) and receiving echoes from objects in the water, from the bottom surface, or both.

The sonar unit often includes the electronic circuitry that produces a sonar pulse consisting of several cycles of a sonic signal at a fairly high output power. This pulse is delivered to the transducer usually via a shielded twisted pair cable. After transmission of the pulse, the transducer is typically used to "listen" for echoes. Received echoes produce very small signals, on the order of a few milli-volts, which are sent via a transmission line to a receiver circuitry in the sonar unit. In the sonar unit, the received echoes are amplified, filtered, and analyzed.

SUMMARY

Acoustic transducers, especially broadband, communication, and weapons system transducers are prone to self-heating due to the high power and long duty cycles.

An example embodiment of the present invention relates to a method and corresponding apparatus for controlling the temperature of an acoustic transducer. The example embodiment monitors the temperature of the acoustic transducer and controls the temperature as a function of adjusting one or more characteristics of the acoustic transducer.

Another embodiment of the present invention relates to a method and corresponding apparatus that obtains temperature information from an acoustic transducer. The example embodiment compares the obtained temperature information against a database of known temperature values associated with transducer characteristics and controls the temperature of the acoustic transducer as a function of adjusting the transducer characteristics.

Yet another embodiment of the present invention relates to a method and corresponding apparatus that obtains characteristics information including information regarding at least one of impedance, voltage, current, phase angle, or temperature of internal transducer components from an acoustic transducer. The example embodiment compares the characteristics information against a database of known temperature values associated with transducer characteristics information values and adjusts the temperature as a function of adjusting the transducer characteristics information to reduce self-heating of the transducer.

The characteristic information of the transducer may include drive waveform of the transducer.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

DETAILED DESCRIPTION

A description of example embodiments of the invention follows.

Figure 1:
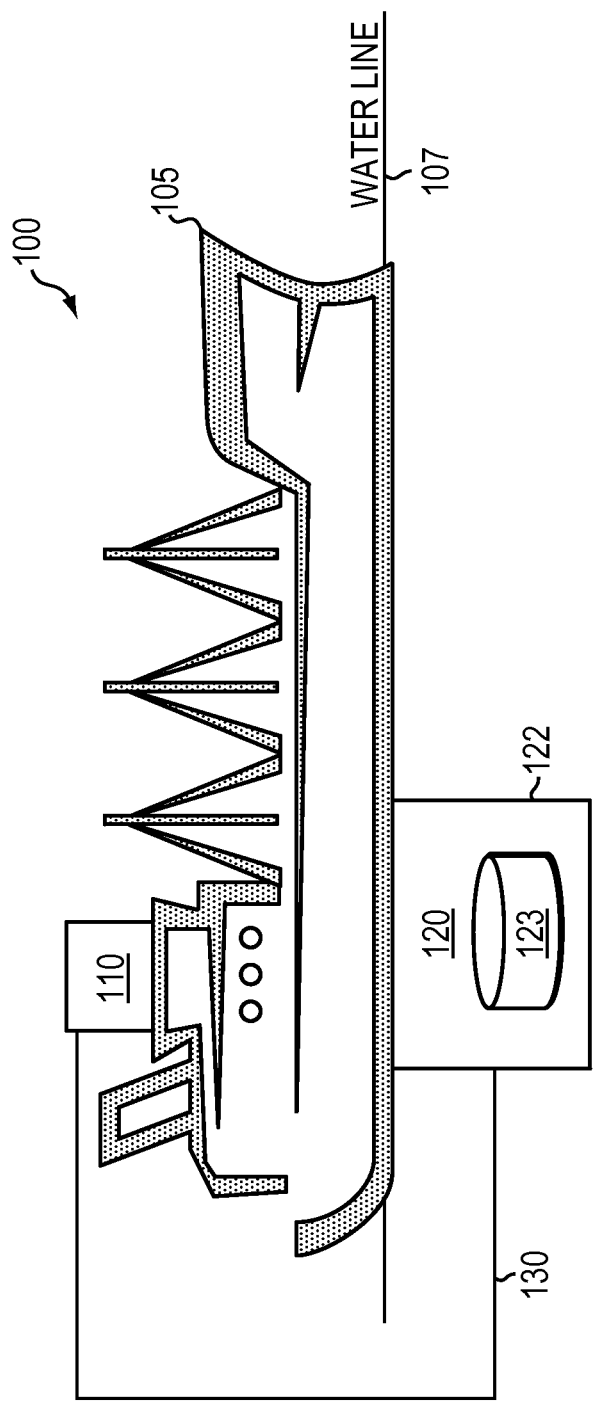
FIG. 1 is an illustration of a perspective view of a vessel including an echosounder and a transducer.

FIG. 1 is an illustration 100 of a perspective view of a vessel 105 including an echosounder 110 and a transducer 120. The echosounder 110 and associated circuitry are often located in the driving station of the vessel 105. The transducer 120 is often mounted on the vessel below the waterline 107 for generating a sonic pulse and receiving echoes from objects in the water, or the bottom surface. The echosounder 110 does not need to have any information about the type and/or characteristics of the transducer 120 to which it will connect. However, such information, if known, may be used to optimize the performance of the overall system and/or to protect the transducer 120 from overdrive. Overdrive may include excess voltage, excess current, excess power, excess pulse duration, excess duty cycle, or combination thereof. Performance optimization may include altering certain features or parameters of the echosounder 110. Such characteristics may include power rating, bandwidth, and impedance. For example, the echosounder 110 may perform optimization by dynamically tuning the matching circuitry within the echosounder to provide optimum energy transfer using the impedance of the transducer at the transducer's resonance frequency or the echosounder may automatically limit its sonar transmit power to reduce damage to the transducer using the transducer's power rating.

A Transducer ID system (XducerID®, available from Airmar Technology Corp. Milford, N.H.) includes an echosounder 110, a transducer 120 (e.g., an acoustic transducer), and a communication bus (communication cable) 130. The transducer 120 may contain one or more piezoelectric elements 123 having varying characteristics that are contained within a housing 122 of the transducer assembly 120 that can be adapted to be mounted to a marine vessel 105. The echosounder 110 contains electronic circuitry for driving transducer element 123 (such as a piezoelectric element) within the transducer 120 to transmit a sonic acoustic pulse and for amplifying and filtering received echoes from the piezoelectric elements 123. Certain embodiments may include using other transducers known in the art such as magnetostriction transducers or electrodynamic transducers together with the transducer ID system.

The transducer 120 may further include a non-volatile memory device (not shown) within a microprocessor, microcontroller, or state machine that contains the characteristic information of the transducer. The microcontroller, upon system initialization or power-up, may communicate the characteristic information of the transducer from the memory device to the echosounder 110 via the communication bus 130.

The communication bus 130 may be a single conductor (wire) plus a ground return in the transducer cable, a multi wire bus, or a fiber optic cable. In a Transducer ID system 100, the echosounder 110 and the transducer both include a certain amount of circuitry. The echosounder 110 provides power to the circuitry in the transducer 120. In certain embodiments, the communication bus 130 may provide power to the memory device and the microcontroller embedded in the transducer and/or allow bidirectional serial communication (e.g., half duplex) between the echosounder 110 and the transducer 120. A cable shield may be used as the ground return of the communication bus 130.

In certain embodiments, the echosounder 110 and the transducer 120 may communicate via a wireless connection.

In certain embodiments, the transducer 120 may communicate with the echosounder 110 via an optional wireless communications link (not shown). Generally, any form of communications available in the art may be used to communicate between the transducer and the echo sounder.

The transducer 120 may further include a temperature sensor such as a thermistor. In certain embodiments, the transducer 120 may include multiple thermistors (e.g., up to three thermistors) for monitoring transducer 120, water temperature, and/or water temperature in transducer housing for sonar dome or in-hull designs.

In certain embodiments, the echosounder may employ a command (e.g., "MEAS_TEMP") to instruct the transducer 120 to obtain temperature readings. In some embodiments, the temperature readings are taken on power-up by default and at 1 second intervals while remaining powered-up. In response, the transducer 120 measures the temperature on the thermistors and stores these values in the memory buffer for corresponding temperature fields. In certain embodiments, temperature may be monitored by periodically sending a "READ_TEMP" command to the transducer.

Sonar transducers, especially broadband, communication, and weapons system transducers are prone to self-heating due to the high power and long duty cycles. Certain embodiments of the present invention relate to transducer thermal management. Specifically, some embodiments may use a three-pronged systems approach to control heating within acoustic transducers when they are being driven at high power levels, at large duty cycles, or both. The transmit waveform may be a pure tone, or a swept frequency, or any other broadband waveform useful for sonar or communications purposes. Duty cycle may be the ratio of pulse (or burst) duration divided by the time interval between pulses.

Certain embodiments may use passive thermal mitigation, information received from the internal microprocessor embedded in the transducer (hereinafter referenced as "eXID"), and active measurement of impedance, voltage, current, phase, and temperature to adjust power and/or duty cycle applied to a transducer to control transducer self-heating and to optimize system performance.

Some embodiments may provide redundancy in the monitoring of important characteristics within the transducer (e.g., temperature and impedance) to protect against thermal runaway and transducer failure, while optimizing the performance of the transducer-echosounder system. This redundancy allows for the system to be configured and utilized achieving the same goal in one or more of three different ways.

Figure 2:
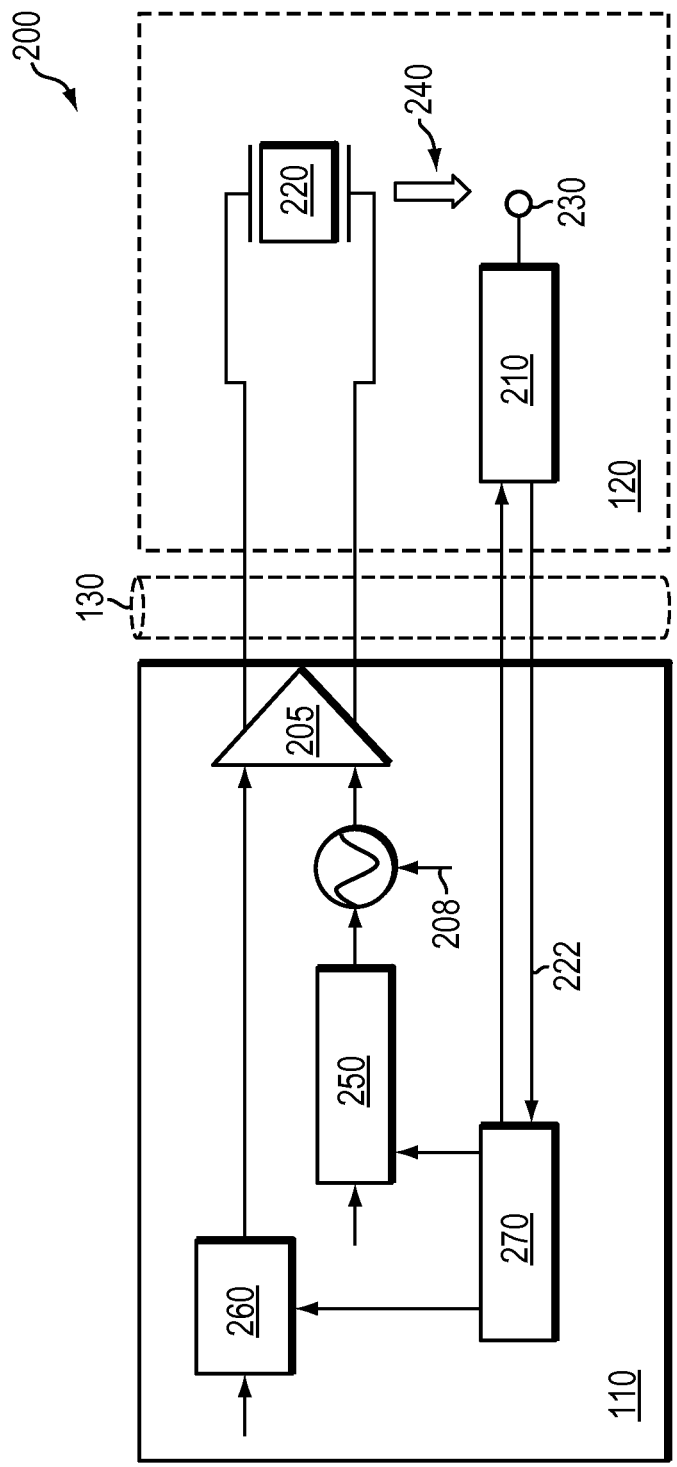
FIG. 2 is a block diagram of an example embodiment of the present invention for controlling temperature of an acoustic transducer.

FIG. 2 is an illustration of a perspective view 200 of an example embodiment of the present invention for controlling temperature of a transducer 120 (e.g., acoustic transducer). As shown in FIG. 2, an encapsulated transducer assembly 120 may include the microprocessor/microcontroller 210, a transducer element 220 (e.g., transducer ceramic element or any other transducer element available in the art), as well as one or more thermistors 230. The transducer element 220 is often used to provide the transducer assembly 120 with the capability to convert received electrical pulses to corresponding mechanical vibrations and/or convert received mechanical vibrations into corresponding electrical pulses. This conversion between electrical pulses and mechanical vibrations may result in some energy loss as heat 240. The thermistor(s) 230 may sense the amount of this exhausted heat (along with water temperature). The microprocessor/microcontroller 210 reports the sensed temperature data 222 via the communication bus 130 to the echosounder 110.

In certain embodiments, the echosounder 110 may include an amplifier 205 capable of providing the proper waveform 208, using the appropriate frequencies, at a suitable voltage level, and for an appropriate pulse duration and pulse repetition rate. The echosounder queries transducer 120 for internal temperatures of the transducer 120. Upon receiving the internal temperature data 222 of the transducer 120, the echosounder 110 cross-references (optionally using a logic 270) this received temperature data against stored temperature vs. impedance data of the transducer 120 (the impedance data of the transducer 120 may be stored on the transducer 120), and adjusts its power 260 and/or duty cycle 250 to optimize system performance, reduce thermal runaway and damage to the transducer 120.

Figure 3:
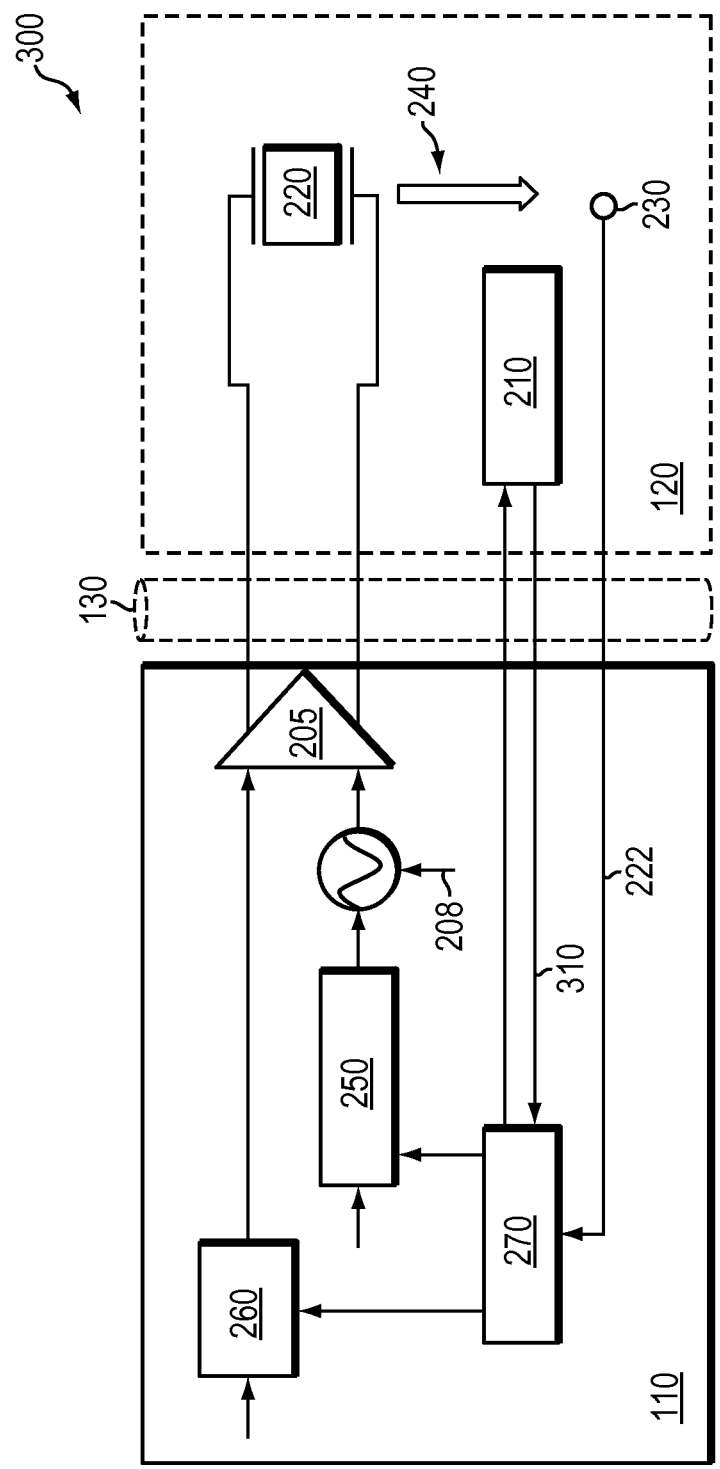
FIG. 3 is a block diagram of an example embodiment of the present invention for controlling temperature of an acoustic transducer.

FIG. 3 is an illustration of a perspective view 300 of another example embodiment of the present invention for controlling temperature of a transducer 120 assembly (e.g., acoustic transducer). The transducer assembly 120 includes a transducer element 220, one or more thermistor(s) 230 that measure and/or read the temperature information of the transducer, and a microprocessor/microcontroller 210 that may transmit the temperature information of the transducer 120. The example embodiment may utilize the functions of transducer assembly 120 but may also require extra functionality within the echosounder 110. Specifically, the echosounder may actively measure the internal temperature of the transducer 120 components directly and not rely on the transducer assembly 120 to measure its temperatures. In certain embodiments, the echosounder 110 may connect to the transducer assembly 120 over a communication bus 130. In some embodiments, the temperature information 310 may be transmitted from the microprocessor/microcontroller 210 to the echosounder 110 over the bus 130. As the echosounder 110 measures the temperature, it cross-references the measured temperature values 222 (or obtained temperature values 222) against stored temperature vs. impedance data stored within transducer. Based on the received temperature information 310 and/or obtained temperature information 222, the power 260 and/or duty cycle 250 may be adjusted by the echosounder to optimize system performance, reduce thermal runaway, and damage to the transducer.

Figure 4:
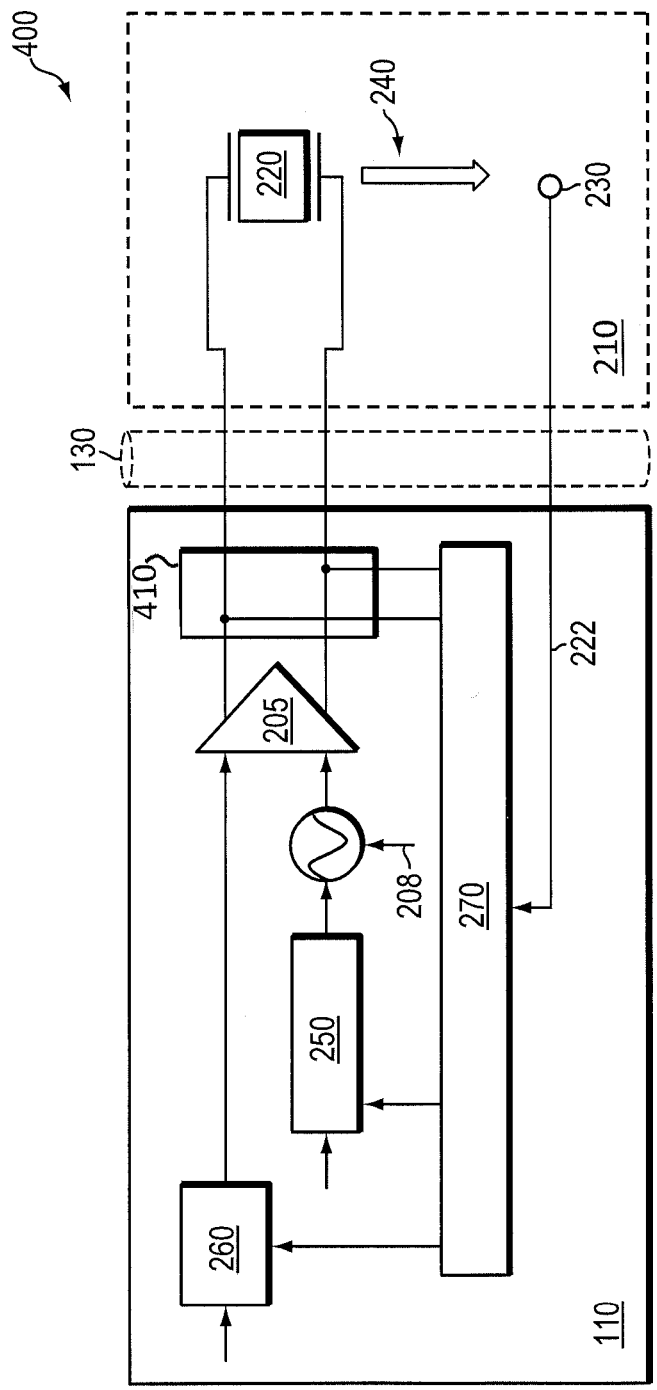
FIG. 4 is a block diagram of an example embodiment of the present invention for controlling temperature of an acoustic transducer.

FIG. 4 is an illustration of a perspective view 400 of yet another example embodiment of the present invention for controlling temperature of a transducer 120 (e.g., acoustic transducer). The example embodiment may utilize the echosounder 110. Specifically, the echosounder 110 is capable of the active measurement of impedance Z, voltage V, current I, phase $\phi$ and temperature of the transducer assembly 120 components. The echosounder may obtain these measurements using the bidirectional communication bus 130 and/or network connection 410. As such, the echo sounder 110 may adjust the power 260 and/or duty cycle 250 to optimize system performance, reduce thermal runaway or damage to the transducer without the need to use transducer assembly 120. This embodiment may also establish a baseline parameter set of V, I, $\phi$, etc. during a low-duty-cycle measurement interval to use as a reference during higher drive conditions. Although, the echosounder 110 may not know historical data of how the impedance of the transducer varies with temperature (this information 410 may be provided from the transducer 120), it may actively maintain a preset impedance tolerance and therefore temperature by controlling the power and/or duty cycle. In piezoceramic acoustic transducers 120, a decrease in impedance is usually indicative of an increase in temperature. Conversely an increase in impedance is indicative of a decrease in temperature.

In certain embodiments, the echosounder 110 may also use its ability to measure these parameters to compare the measurements with the temperature vs. impedance data provided by transducer assembly 120 (if available in the transducer) and to verify the results.

Passive thermal mitigation strategies control the heating of transducer assembly 120 components. These include the use of common medium and high thermal conductivity materials (e.g., aluminum, copper, steel, as well as composite filler-loaded plastics and tapes) to provide as much passive cooling to the transducer as possible. Active measurements, and the transducer 120 itself, provide additional thermal control if the passive measures are insufficient, thus reducing damage to the transducer and allowing for increased (higher) drive levels when the transducer is being cooled by forced convection or operating in colder environments.

The echosounder 110 may be configured to have certain capabilities in order to thermally manage a transducer and add redundancy to the system. The echosounder 110 may be configured to query and read the transducer 120 for transducer element 220 and water temperatures as well as the stored data of temperature vs. impedance to assist in the control of the power and duty cycle. The echosounder 110 may also be configured to measure impedance actively by monitoring the voltage V, current I and phase angle $\phi$ of the transducer. The echosounder 110 may also be configured to monitor the internal temperatures of the transducer components if the temperature measuring capability of transducer 120 is not used. By recognizing a change in either component temperatures or impedance, or both, the echosounder 110 can control the power level, or duty cycle, or both of the transducer 120 to match the current impedance and temperature conditions to provide constant temperature operation and/or to control against thermal runaway and optimize system performance.

The ability of an echosounder 110 to read the transducer 120 and measure impedance, voltage, current, and phase may allow any transducer 120 to be attached to the echosounder 110 and driven optimally. The echosounder 110 may be able to query the transducer 120 for stored information such as power rating and nominal operating frequency, conduct measurements on the transducer 120, adjust its own output to match the characteristics of the transducer, and optimize system performance by providing the best drive level and duty cycle for the transducer 120.

Figure 5:
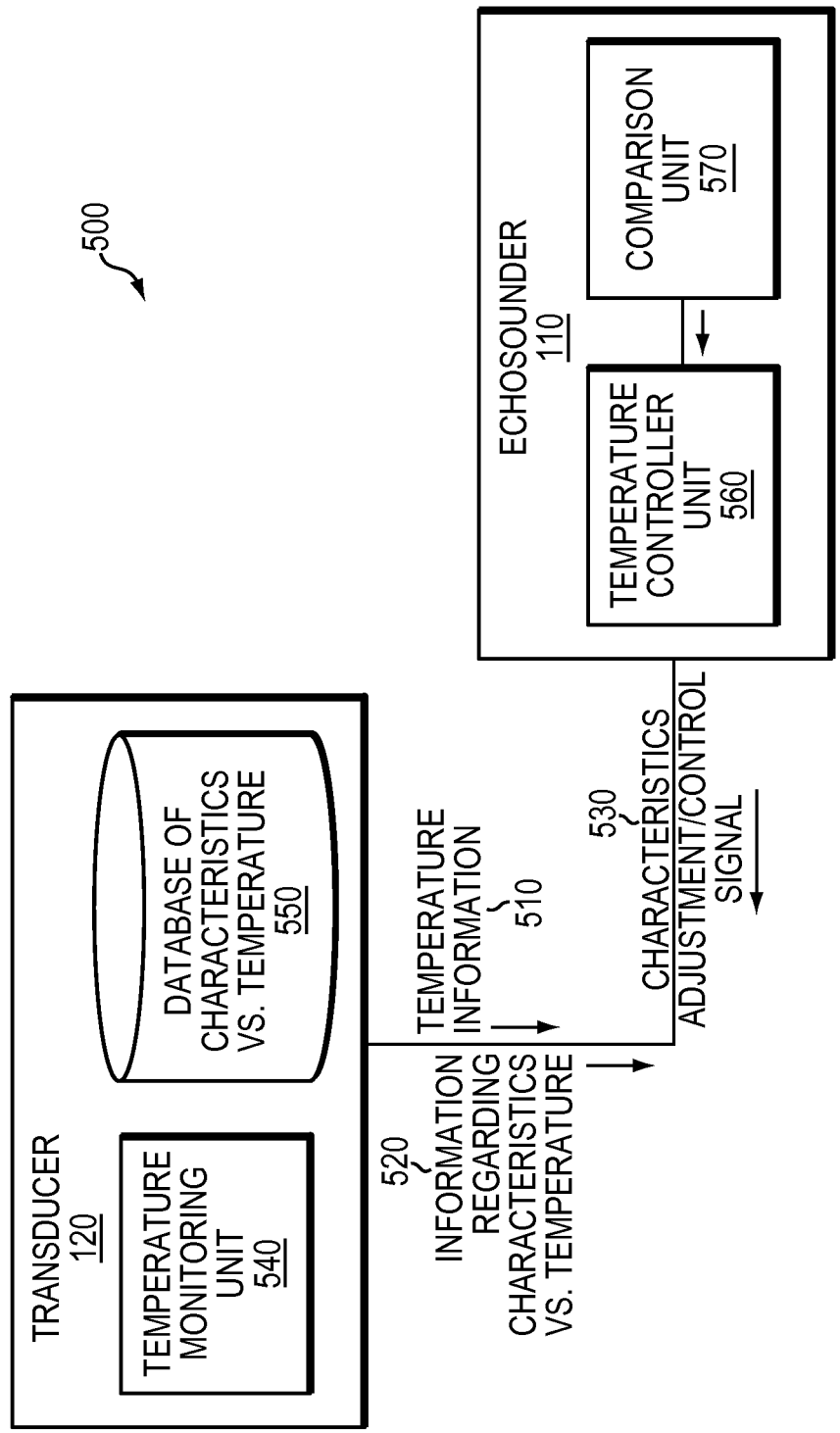
FIG. 5 is a high-level functional diagram of procedures for an example embodiment that includes a transducer including a temperature monitoring unit.

FIG. 5 is a high-level functional diagram of procedures for an example embodiment 500 that includes a transducer 120 including a temperature monitoring unit 540 and a database 550 storing characteristics of the transducer at various temperatures. The transducer 120 transmits temperature data 510 as well as information regarding characteristics of the transducer vs. temperature 520 to an echosounder 110. The echosounder 110 includes a comparison unit 570 that compares the received temperature data 510 against the information regarding characteristics of the transducer vs. temperature 520. Based on the comparison results of the comparison unit 570, the temperature controller unit 560 sends adjustment and/or control signals 530 to the transducer 120. The adjustment and/or control signals 530 adjusts the characteristics of the transducer such as duty cycle and power to control against thermal runaway and optimize system performance.

Figure 6:
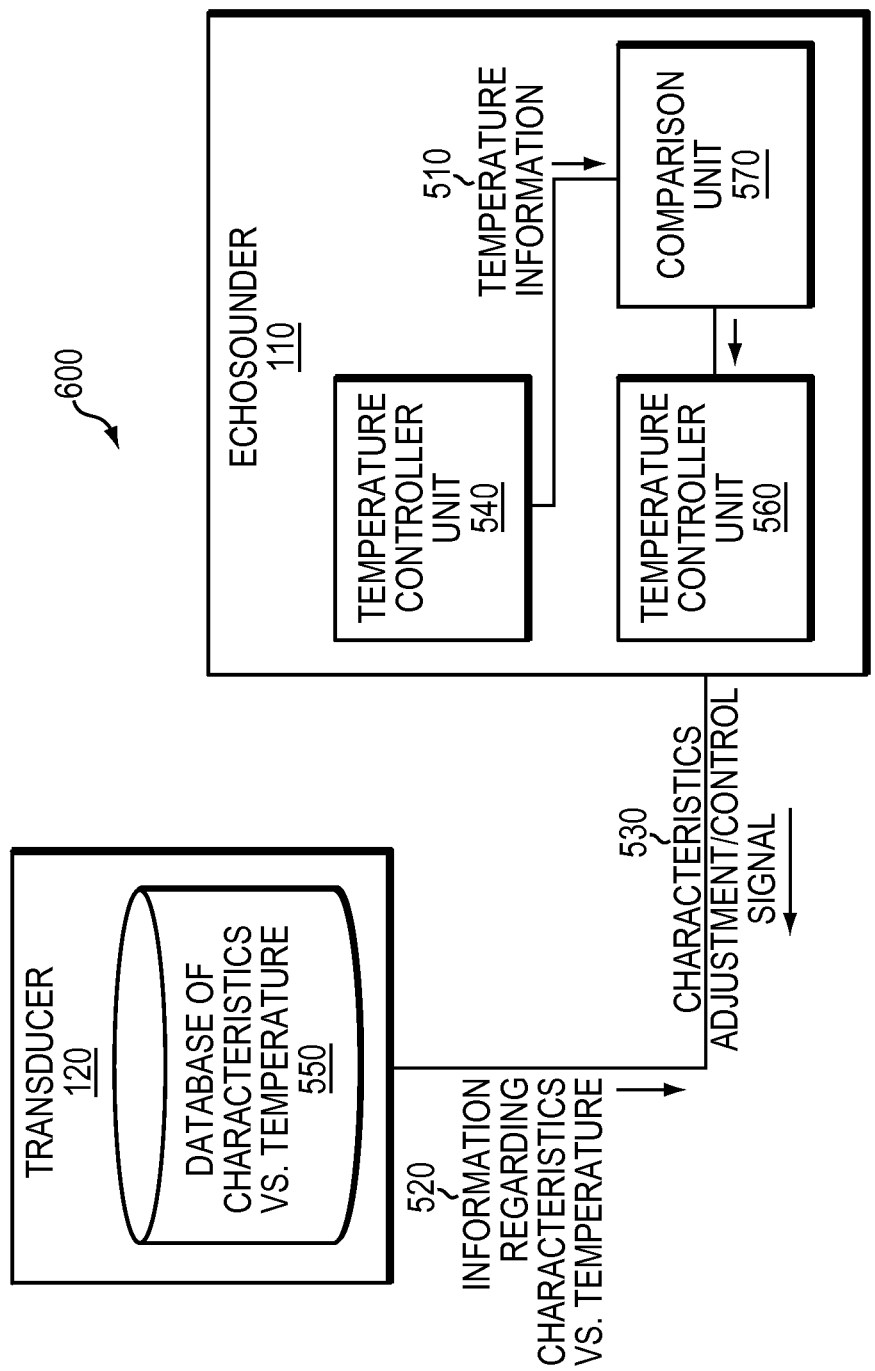
FIG. 6 is a high-level functional diagram of procedures for an example embodiment that includes an echosounder including a temperature monitoring unit.

FIG. 6 is a high-level functional diagram of procedures for an example embodiment 600 that includes an echosounder including a temperature monitoring unit 540. The temperature monitoring unit determines the temperature data of the transducer 510 (optionally via a bidirectional bus connection (not shown) or a network (not shown). The transducer 120 includes a database 550 of transducer characteristics vs. temperature 550 and transmits information 520 regarding the transducer characteristics vs. temperature 550 to the echosounder. The echosounder 110 includes a comparison unit the compares the received temperature data 510 against the information regarding characteristics of the transducer vs. temperature 520. Based on the comparison results of the comparison unit 570, the temperature controller unit 560 sends adjustment and/or control signals 530 to the transducer 120. The adjustment and/or control signals 530 adjusts the characteristics of the transducer drive waveform such as duty cycle and power to control against thermal runaway and optimize system performance. The drive waveform may be an input voltage that drives the transducer ensure that a maximum instantaneous power is delivered for the duration of a chirp of the acoustic signal.

Figure 7:
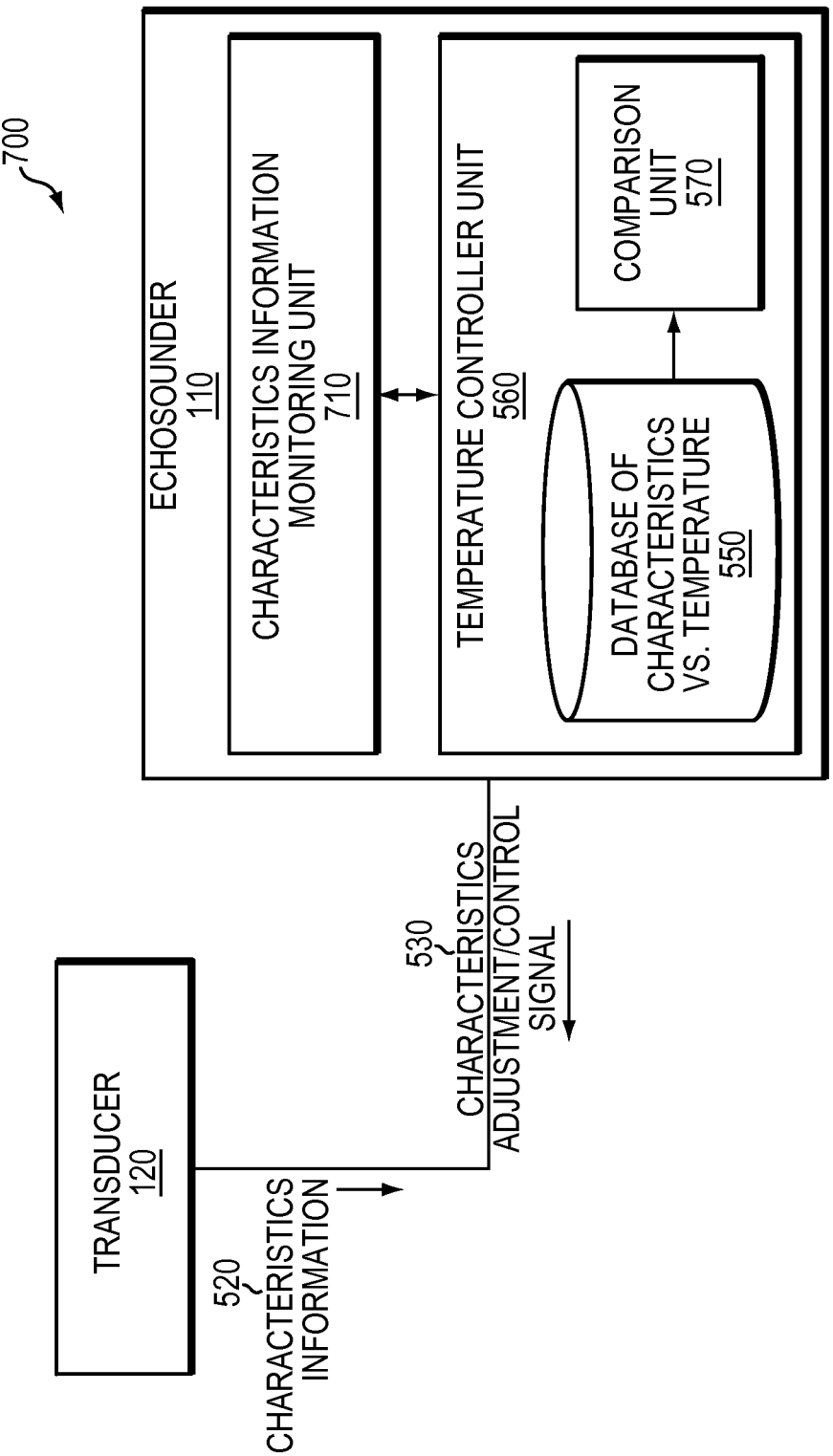
FIG. 7 is a high-level functional diagram of procedures for an example embodiment that includes an echosounder including a characteristics information monitoring unit.

FIG. 7 is a high-level functional diagram of procedures for an example embodiment 700 that includes an echosounder including a characteristics information monitoring unit 710. In this embodiment, the transducer transmits information regarding its characteristics 520 (e.g., impedance, temperature, etc.) to the echosounder 110. The echosounder 110 receives and monitors the information 520 using a characteristics information monitoring unit 710. The comparison unit 570 compares this information 520 against a database 550 of stored characteristics of the transducer 120 vs. temperature. Based on the comparison results of the comparison unit 570, the temperature controller unit 560 sends adjustment and/or control signals 530 to the transducer 120. The adjustment and/or control signals 530 adjusts the characteristics of the transducer drive waveform such as duty cycle and power to control against thermal runaway and optimize system performance.

Figure 8A:
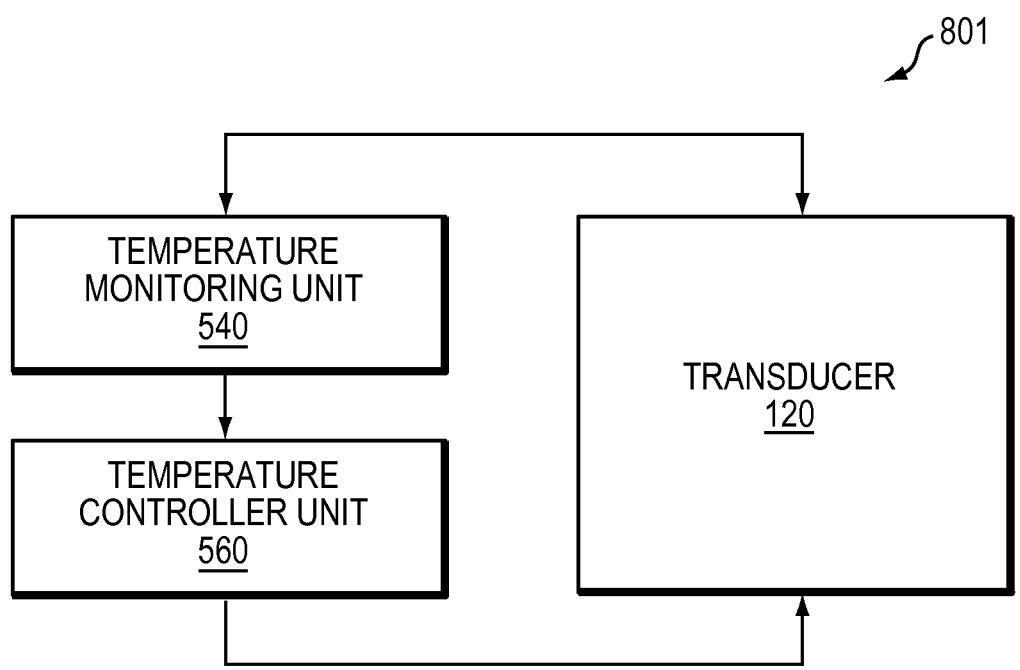
FIGS. 8a-8c illustrate high-level functional diagrams of example embodiments for monitoring temperature in a transducer.

FIG. 8a is a high-level functional diagram of an example embodiment 801 for monitoring temperature in a transducer. The example embodiment 801 includes a temperature monitoring unit 540 that monitors temperature of an acoustic transducer (not shown) and controls the temperature of the acoustic transducer by adjusting one or more characteristics of the acoustic transducer.

Figure 8B:
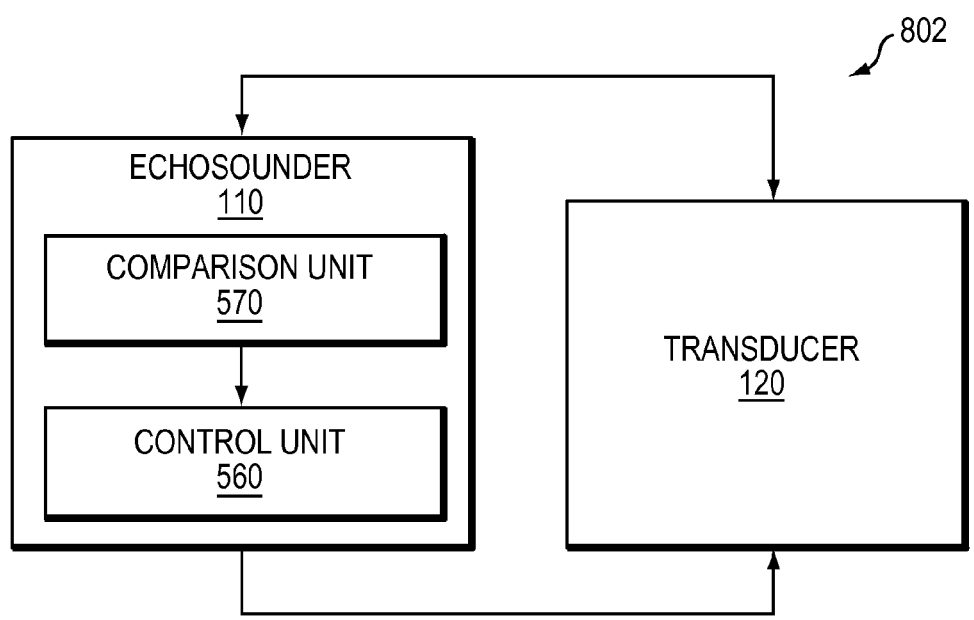
Figure 8C:
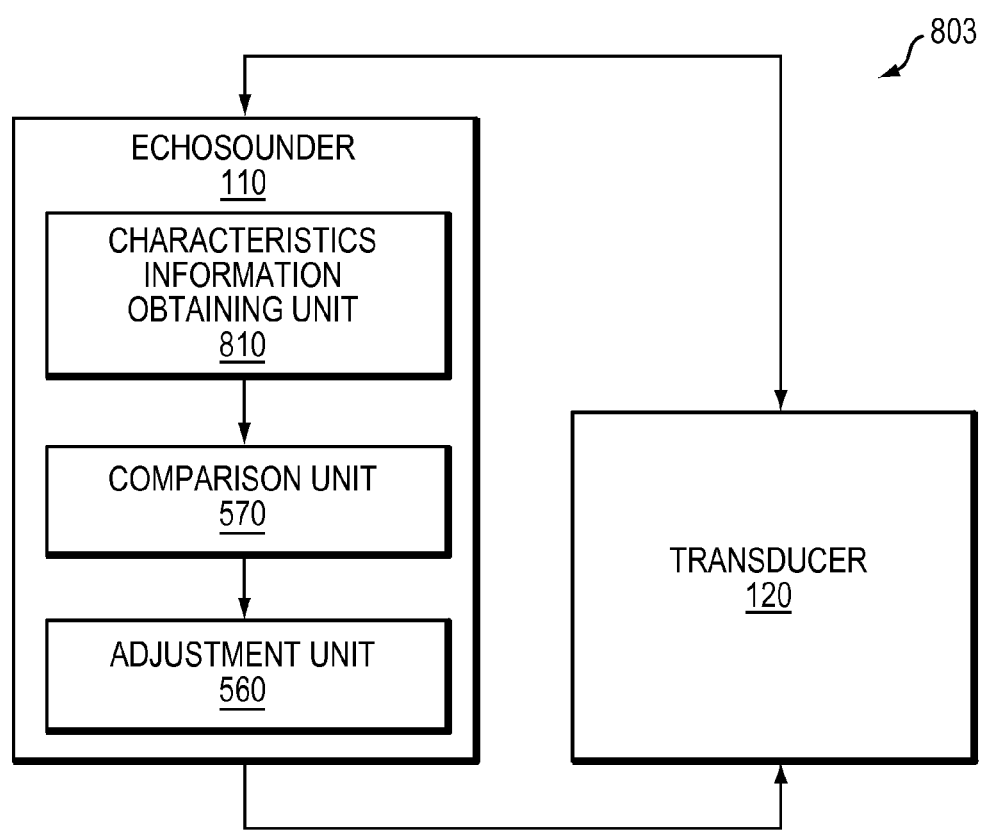

FIG. 8b is functional diagram of an example embodiment 802 for monitoring temperature in a transducer. The example embodiment 802 includes an echosounder 110 that obtains temperature data from a transducer 120. The echosounder 110 includes a comparison unit 570 that compares the obtained temperature information against a database of known temperature values associated with transducer characteristics. The echosounder 110 further includes a control unit 560 that controls the temperature of the transducer 120 by adjusting the transducer drive waveform.

FIG. 8a is a high-level diagram of an example embodiment 803 for monitoring temperature in a transducer. The example embodiment 803 includes an echosounder 110 in communication with an acoustic transducer 120. The echosounder 110 employs a characteristics information obtaining unit 810 to obtain characteristics information including information regarding at least one of impedance, voltage, current, phase angle, or temperature of internal transducer components from the transducer 120. The echosounder further includes a comparison unit 570 that compares the characteristics information against a database of known temperature values associated with transducer characteristics information values. An adjustment unit 560 included in the echosounder 110 adjusts the temperature by adjusting the transducer drive waveform to reduce self-heating of the transducer.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   monitoring temperature of an acoustic transducer as a function of measuring internal temperature of the acoustic transducer; and
   controlling the temperature of the acoustic transducer as a function of adjusting one or more characteristics of the acoustic transducer.

2. The method of claim 1 further including monitoring the temperature of the acoustic transducer using at least one temperature measurement module of the acoustic transducer.

3. The method of claim 2 wherein the temperature measurement module is a thermistor.

4. The method of claim 1 further including controlling the temperature as a function of adjusting at least one of power applied to the acoustic transducer or transducer duty cycle.

5. The method of claim 1 further including controlling the temperature as a function of maintaining a transducer impedance at a preset level.

6. The method of claim 1 wherein the one or more characteristics of the acoustic transducer includes at least one of transducer voltage, transducer current, and transducer electrical phase.

7. The method of claim 1 wherein the one or more characteristics of the acoustic transducer includes drive waveform of the acoustic transducer.

8. An apparatus comprising:
   a temperature monitoring unit to monitor temperature of an acoustic transducer, wherein the temperature monitoring unit is arranged to monitor the temperature of the acoustic transducer as a function of measuring internal temperature of the acoustic transducer; and
   a temperature controller unit to control the temperature of the acoustic transducer as a function of adjusting one or more characteristics of the acoustic transducer.

9. The apparatus of claim 8 wherein the temperature monitoring unit is arranged to monitor the temperature of the acoustic transducer using at least one temperature measurement module of the acoustic transducer.

10. The apparatus of claim 9 wherein the temperature measurement module is a thermistor.

11. The apparatus of claim 8 wherein the temperature controller unit is arranged to control the temperature as a function of adjusting at least one of power applied to the acoustic transducer or transducer duty cycle.

12. The apparatus of claim 8 wherein the temperature controller unit is arranged to control the temperature as a function of maintaining a transducer impedance at a preset level.

13. The apparatus of claim 8 wherein the one or more characteristics of the acoustic transducer includes at least one of a transducer impedance, transducer voltage, and transducer current.

14. The apparatus of claim 8 wherein the one or more characteristics of the acoustic transducer includes drive waveform of the acoustic transducer.

15. A method comprising:
   obtaining temperature information from an acoustic transducer;
   comparing the obtained temperature information against a database of known temperature values associated with transducer characteristics; and
   controlling the temperature of the acoustic transducer as a function of adjusting the transducer characteristics.

16. The method of claim 15 wherein the transducer characteristics include at least one of transducer drive waveform, drive power, and duty cycle.

17. The method of claim 15 further including obtaining the temperature information as a function of measuring internal temperature of the transducer.

18. The method of claim 15 further including obtaining the temperature information as a function of measuring internal temperatures of the transducer at an echosounder in communication with the transducer.

19. An apparatus comprising:
   an echosounder in communication with an acoustic transducer, the echosounder obtaining temperature information from the acoustic transducer;
   a comparison unit for comparing the obtained temperature information against a database of known temperature values associated with transducer characteristics; and
   a control unit for controlling the temperature of the acoustic transducer as a function of adjusting the transducer characteristics.

20. The apparatus of claim 19 wherein the transducer characteristics include at least one of transducer drive power or duty cycle.

21. The apparatus of claim 19 wherein the transducer is arranged to determine the temperature information as a function of measuring internal temperature of the transducer and to report the temperature information to the echosounder.

22. The apparatus of claim 19 wherein the echosounder is arranged to determine the temperature information as a function of measuring internal temperatures of the transducer.

23. The apparatus of claim 19 wherein the acoustic transducer and the echosounder are coupled via a communication bus or a network connection.

24. The apparatus of claim 23 wherein the echosounder is arranged to obtain the temperature information from the acoustic transducer via at least one of the communication bus or the network connection.

25. The apparatus of claim 19 wherein the temperature information includes at least one of internal transducer temperature, external water temperature, and water temperature in transducer housing.

26. The apparatus of claim 19 wherein the temperature information includes external water temperature.

27. A method comprising:
obtaining characteristics information including information regarding at least one of impedance, voltage, current, phase angle, or temperature of internal transducer components from an acoustic transducer;
comparing the characteristics information against a database of known temperature values associated with transducer characteristics information values; and
adjusting the temperature as a function adjusting the transducer characteristics information to reduce self-heating of the transducer.

28. An apparatus comprising:
an echosounder in communication with an acoustic transducer, the echosounder obtaining characteristics information including information regarding at least one of impedance, voltage, current, phase angle, or temperature of internal transducer components from the acoustic transducer;
a comparison unit for comparing the characteristics information against a database of known temperature values associated with transducer characteristics information values; and
an adjustment unit for adjusting the temperature as a function adjusting the transducer characteristics information to reduce self-heating of the transducer.

29. A method comprising:
monitoring temperature of an acoustic transducer; and
controlling the temperature of the acoustic transducer as a function of adjusting one or more characteristics of the acoustic transducer, wherein the one or more characteristics of the acoustic transducer includes a drive waveform of the acoustic transducer.

30. An apparatus comprising:
a temperature monitoring unit to monitor temperature of an acoustic transducer; and
a temperature controller unit to control the temperature of the acoustic transducer as a function of adjusting one or more characteristics of the acoustic transducer, wherein the one or more characteristics of the acoustic transducer includes a drive waveform of the acoustic transducer.

* * * * *